US006456981B1

(12) United States Patent
Dejaeger et al.

(10) Patent No.: US 6,456,981 B1
(45) Date of Patent: Sep. 24, 2002

(54) METHOD AND APPARATUS FOR DISPLAYING A CUSTOMIZED ADVERTISING MESSAGE WITH A RETAIL TERMINAL

(75) Inventors: Wilfried E. Y. Dejaeger, Brussels (BE); Alfred J. Hutcheon, Alpharetta, GA (US)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/595,125

(22) Filed: Jun. 16, 2000

Related U.S. Application Data

(63) Continuation of application No. 09/164,099, filed on Sep. 30, 1998, now abandoned.

(51) Int. Cl.[7] .............................................. G06F 17/60
(52) U.S. Cl. ....................................................... 705/14
(58) Field of Search ............................... 705/1, 10, 14, 705/16; 235/380, 383, 492

(56) References Cited

U.S. PATENT DOCUMENTS

| | | |
|---|---|---|
| 4,345,315 A | 8/1982 | Cadotte et al. |
| 4,355,372 A | 10/1982 | Johnson et al. |
| 4,649,481 A | 3/1987 | Takahashi |
| 4,825,045 A | 4/1989 | Humble |
| 4,882,724 A | 11/1989 | Vela et al. |
| 4,905,094 A | 2/1990 | Pocock et al. |
| 4,958,284 A | 9/1990 | Bishop et al. |
| 4,962,466 A | 10/1990 | Revesz et al. |
| 4,972,504 A | 11/1990 | Daniel, Jr. et al. |
| 4,982,346 A | 1/1991 | Girouard et al. |
| 5,173,851 A | 12/1992 | Off et al. |
| 5,237,157 A | 8/1993 | Kaplan |
| 5,245,533 A | 9/1993 | Marshall |
| 5,249,044 A | 9/1993 | Von Kohorn |
| 5,305,195 A | 4/1994 | Murphy |
| 5,315,093 A | 5/1994 | Stewart |
| 5,331,544 A | 7/1994 | Lu et al. |
| 5,355,327 A | 10/1994 | Stent et al. |

(List continued on next page.)

FOREIGN PATENT DOCUMENTS

EP 0991006 * 4/2000 ................... 705/14

OTHER PUBLICATIONS

Capturing the Elusive SHopper by Laurie Petersen, ADWEEK Western Advertising News, Sep. 17, 1990.*
Innovative High–Tech Retail Program Sets Jan. 21 Los Angeles Debut at Beverly Center, PR Newswire, Jan. 20, 2000.*
Petersen, Laurie, "Capturing the Elusive Shopper", ADWEEK Western Advertising News, v40, n38, pS 197(5), Sep. 17, 1990.

*Primary Examiner*—Stephen Gravini
(74) *Attorney, Agent, or Firm*—Maginot, Moore & Bowman LLP

(57) ABSTRACT

A method of advertising with a retail system having a display monitor associated therewith is disclosed. The method includes the step of operating a kiosk of the retail system in order to obtain product information associated with a first item without transacting a sale of the first item. The method also includes the step of entering a record corresponding to the first item in a user profile in response to the kiosk operating step. Further, the method includes the step of operating a checkout terminal of the retail system so as to transact a sale of a second item. The method additionally includes the step of displaying an advertising message on the display monitor during the checkout terminal operating step based on the record corresponding to the first item which was entered in the user profile. An apparatus for displaying a customized advertising message with a retail terminal is also disclosed.

24 Claims, 9 Drawing Sheets

U.S. PATENT DOCUMENTS

| | | |
|---|---|---|
| 5,361,200 A | 11/1994 | Weybright et al. |
| 5,430,644 A | 7/1995 | Deaton et al. |
| 5,490,060 A | 2/1996 | Malec et al. |
| 5,502,636 A | 3/1996 | Clarke |
| 5,530,900 A | 6/1996 | Sterling |
| 5,535,118 A | 7/1996 | Chumbley |
| 5,550,746 A | 8/1996 | Jacobs |
| 5,557,721 A | 9/1996 | Fite et al. |
| 5,559,949 A | 9/1996 | Reimer et al. |
| 5,612,868 A | 3/1997 | Off et al. |
| 5,619,558 A | 4/1997 | Jheeta |
| 5,621,812 A | 4/1997 | Deaton et al. |
| 5,634,101 A | 5/1997 | Blau |
| 5,641,039 A * | 6/1997 | Dumont ................ 186/61 |
| 5,642,484 A | 6/1997 | Harrison, III et al. |
| 5,664,111 A | 9/1997 | Nahan et al. |
| 5,687,322 A * | 11/1997 | Deaton et al. ............ 705/14 |
| 5,752,582 A | 5/1998 | Hayward |
| 5,915,243 A | 6/1999 | Smolen |
| 5,918,211 A * | 6/1999 | Sloane ................ 705/14 X |
| 5,979,757 A * | 11/1999 | Tracy et al. ............ 235/383 |
| 6,009,410 A * | 12/1999 | LeMole et al. ............ 705/14 |
| 2001/0013013 A1 * | 8/2001 | Takenaga ............... 705/14 |

\* cited by examiner

METHOD AND APPARATUS FOR DISPLAYING A CUSTOMIZED ADVERTISING MESSAGE WITH A RETAIL TERMINAL

CROSS REFERENCE

Cross reference is made to copending U.S. patent application Ser. No. 09/164,097, entitled "Method and Apparatus for Compiling a Retail Survey with a Retail Terminal" by Wilfried Dejaeger, which is assigned to the same assignee as the present invention, and which is filed concurrently herewith.

This application is a continuation of application Ser. No. 09/164,099, filed on Sep. 30, 1998, now abandoned.

TECHNICAL FIELD OF THE INVENTION

The present invention relates generally to a retail terminal, and more particularly to a method and apparatus displaying a customized advertising message with a retail terminal.

BACKGROUND OF THE INVENTION

In the retail industry, a large number of factors contribute to a given customer's selection of one retailer over another. For example, a customer may select a retailer based on the price of the goods sold, the location of the retailer's store, the appearance of the retailer's store, or the selection of goods being offered by the retailer.

Hence, it is generally desirable for a retailer such as a grocery store or department store to ascertain the level of satisfaction associated with a customer's perception of the retailer. In particular, retailers generally desire to know if their customers perceive the retailer in a positive manner. To this extent, retailers have heretofore performed a number of surveys or the like. The retailer generally performs such a survey by having a number of employees ask customers a number of predetermined questions while the customer is shopping in the retailer's store. Alternatively, the retailer may opt to mail a written survey to the residences of the retailer's customers. In either situation, the survey questions asked by the retailer are typically identical for each customer thereby preventing the retailer from soliciting customized responses from the customer on issues or products which may be particular to the individual customer.

Moreover, it is generally desirable for the retailer to advertise certain products or services to the customer during the customer's visit to the retail store. In particular, retailers generally have a number of promotions ongoing at any given time which the retailer desires to communicate to the customer. Such promotions are intended to entice the customer to purchase an item or service which the customer may otherwise not have purchased. To this extent, retailers have heretofore attempted to communicate or advertise such promotions to the customer in a number of varying manners. Retailers have heretofore posted signs or display sections at various areas of the store in order to attract the attention of the customer. Moreover, retailers have placed electronic terminals in various locations throughout the store which display video and/or audio advertising messages in order to attract the attention of the customer. However, the advertising message produced by the retailer in either of the above-noted situations is typically identical for each customer thereby preventing the retailer from presenting a customized advertising message to the customer which may be of particular interest to the individual customer. For example, a display section or video message for a promotion relating to a sale in the retailer's seafood department would not be beneficial or persuasive if directed to a customer that dislikes seafood.

What is needed therefore is a method and apparatus for displaying a customized advertising message with a retail terminal which overcomes one or more of the above-mentioned drawbacks. What is also needed is a method and apparatus for displaying a customized advertising message with a retail terminal which may be utilized to direct a customized advertising message at a given customer.

SUMMARY OF THE INVENTION

In accordance with a first embodiment of the present invention, there is provided a method of advertising with a retail terminal having a display monitor associated therewith. The method includes the step of retrieving retail information included in a user profile associated with a user's previous use of the retail terminal. The method also includes the step of displaying an advertising message on the display monitor based on the retail information of the user profile.

In accordance with a second embodiment of the present invention, there is provided a method of operating a retail checkout terminal. The method includes the step of operating the retail checkout terminal so as to allow the user to enter items for purchase into the retail checkout terminal. The method also includes the step of retrieving retail information included in a user profile associated with a user's previous use of the retail checkout terminal. The method further includes the step of generating an advertising message based on the retail information of the user profile. The method yet further includes the step of communicating the advertising message to the user on a communication device associated with the retail checkout terminal. Both the generating step and the communicating step are performed during the operating step.

In accordance with a third embodiment of the present invention, there is provided an apparatus for displaying a retail advertisement with a retail terminal. The apparatus includes a mechanism for retrieving retail information included in a user profile associated with a user's previous use of the retail terminal. The apparatus also includes a display monitor for displaying an advertising message based on the retail information of the user profile.

It is therefore an object of the present invention to provide a new and useful method and apparatus for displaying a customized advertising message with a retail terminal.

It is moreover an object of the present invention to provide an improved method and apparatus for displaying a customized advertising message with a retail terminal.

It is yet another object of the present invention to provide a method and apparatus for displaying a advertising message with a retail terminal which generates customized advertising messages for a given customer.

It is moreover an object of the present invention to provide a method an apparatus for displaying a customized advertising message with a retail terminal which utilizes an number of electronic terminals commonly found in a retail store.

The above and other objects, features, and advantages of the present invention will become apparent from the following description and the attached drawings.

DETAILED DESCRIPTION OF THE INVENTION

Figure 1:
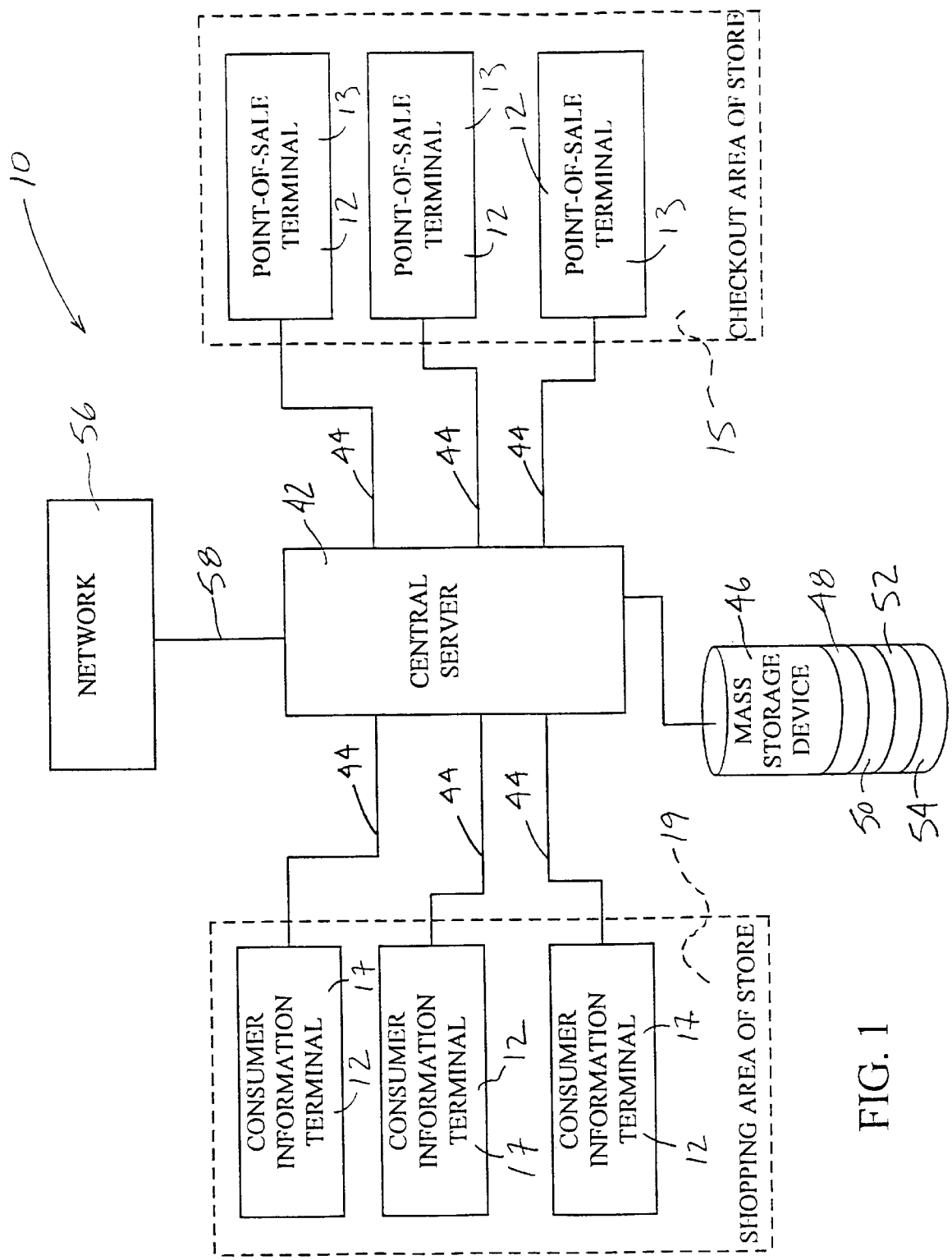
FIG. 1 is a block diagram of a retail system which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a retail system 10 for use in a retail operation such as a grocery store. The retail system 10 includes a number of retail terminals 12. The retail terminals 12 are preferably embodied as electronic terminals utilized in a retail operation. For example, the retail terminals 12 may be embodied as a number of point-of-sale terminals 13, such as the self-service checkout terminal 18 shown in FIG. 2, located within a checkout area 15 of the retailer's store. Moreover, the retail terminals 12 may also be embodied as a number consumer information terminals 17, such as the consumer interactive terminal 20 shown in FIG. 3, located within a shopping area 19 of the retailer's store. In addition, the retail terminals 12 may be embodied to include a number of assisted checkout terminals (i.e. point-of-sale terminals which are operated by a retail clerk) located in the checkout area 15 or a number of kiosks located in the shopping area 19.

Figure 2:
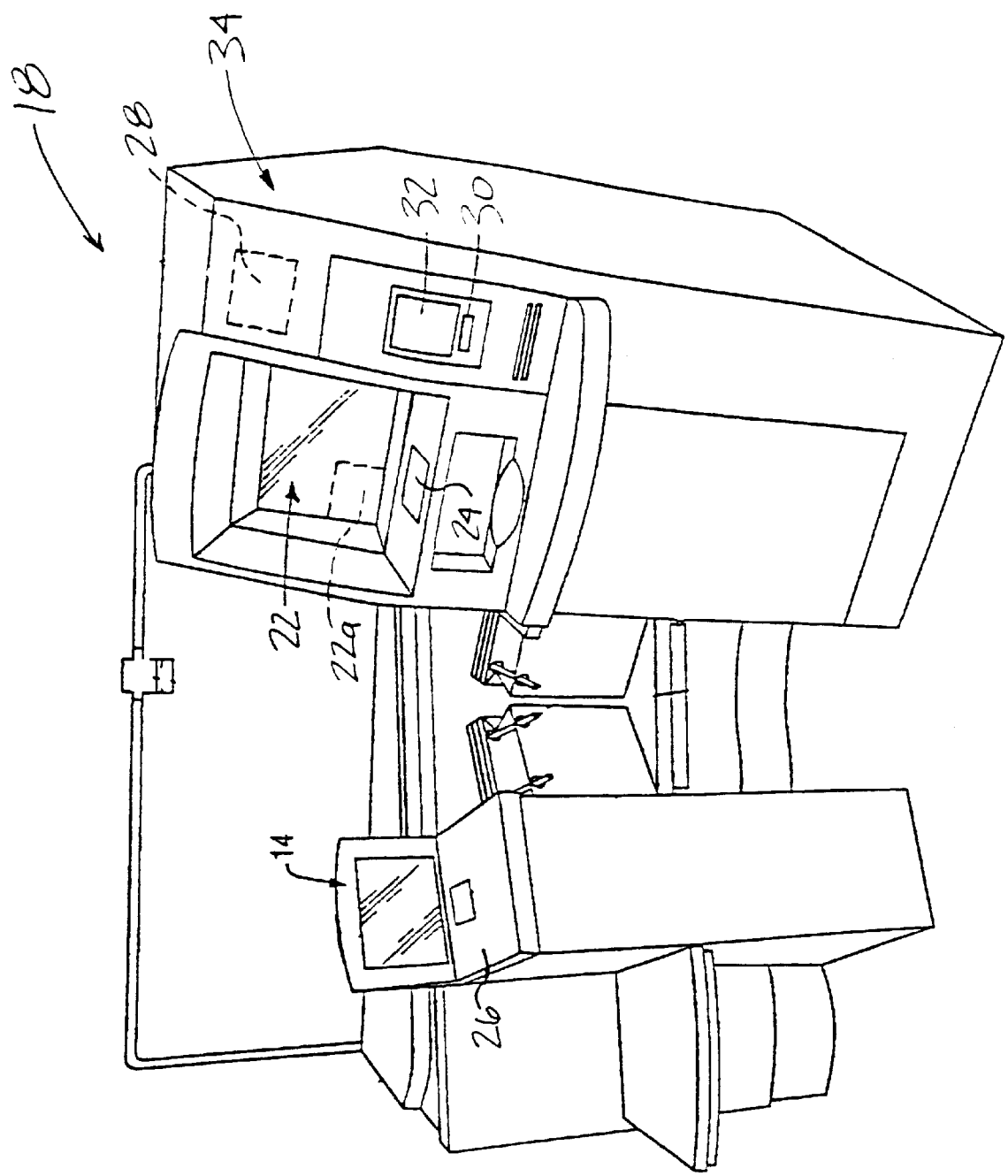
FIG. 2 is a perspective view of a self-service checkout terminal of the retail system of FIG. 1.

As shown in FIG. 2, the self-service checkout terminal 18 includes a scanner 14, a display monitor 22, a data input device 24, a product scale 26, a voice generating device 28, a card reader 30, and a printer 32. The display monitor 22, the data input device 24, the card reader 30, and the printer 32 may be embodied as separate devices, or they may be preferably embodied as integrated components associated with an automated teller machine (ATM) 34.

The scanner 14 conventionally scans or reads a product identification code such as a Universal Product Code (UPC), industrial symbol(s), alphanumeric character(s), or other indicia associated with an item to be purchased. One scanner which may be used in the present invention is a model number 7875 bi-optic scanner which is commercially available from NCR Corporation of Dayton, Ohio.

The scanner 14 includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 14, the scanning light beams scatter off the code and are returned to the scanner 14 where they are collected and detected. The reflected light is then analyzed electronically in order to determine whether the reflected light contains a valid product identification code pattern. As will be discussed below in greater detail, if a valid code pattern is present, the product identification code is then converted into pricing information which is then be used to determine the cost of the item.

The display monitor 22 displays instructions which serve to guide a user or customer through a checkout procedure. For example, an instruction is displayed on the display monitor 22 which instructs the customer to remove an item from the customer's grocery cart and thereafter pass the item over the scanner 14. If the scanner 14 successfully scans or reads the product identification code associated with the item, then a visual indication is generated on the display monitor 22. If for any reason the scanner 14 cannot read or otherwise determine the product identification code associated with the item, a visual error message is generated on the display monitor 22. The display monitor 22 is preferably configured as a known touch screen monitor which can generate data signals when certain areas of the screen are touched by a customer thereby allowing the customer to respond to instructions and/or questions which are displayed on the display monitor 22.

In addition to facilitating the customer's operation of the self-service checkout terminal 18, the display monitor 22 may also be utilized to display an advertising message or a retail survey message to the customer for the purpose of soliciting a response thereto. In particular, as shall be discussed below in more detail, a message may be displayed on a marketing portion 22a of the display screen associated with the display monitor 22 which advertises a product which may be of particular interest to the customer. Moreover, a retail survey, including a series of questions of particular interest to the customer, may be selectively displayed on the marketing portion 22a of the display screen associated with the display monitor 22 which solicits a response from the customer.

In addition to, or in lieu of the display monitor 22, messages and instructions may also be generated by the voice generating device 28. Such a voice generating device 28 may be particularly useful for generating audio or voice instructions or messages for customers who may otherwise be precluded from using the self-service checkout 10. For example, the voice generating device 28 may be used to facilitate operation of the self-service checkout terminal 18 by a sight-impaired customer. Moreover, the voice generating device 28 may be configured in order to operate continually or selectively. In particular, the voice generating device 28 may be configured to operate in conjunction with the display monitor 22. For example, the voice generating device 28 may be used to inform the customer of the type and cost of each item scanned thereby reducing the number of occasions in which the customer must look at the display monitor 22 during operation of the self-service checkout terminal 18. Alternatively, the voice generating device 28 may be configured to operate only after having been actuated by the customer in order to reduce the amount of noise generated at the checkout area 15 of the store. It should be appreciated that actuation of the voice generating device 28 may be accomplished in a number of different manners. For example, information may be stored on a customer's loyalty card which upon insertion of the card into the card reader 30 identifies the customer as being sight-impaired thereby causing the processing unit 12 to actuate the voice generating device 28. Moreover, a portion of the display monitor 22 or a key associated with the data input device 24 may, upon being touched or otherwise pressed by the customer, actuate and/or deactivate the voice generating device 28.

Figure 3:
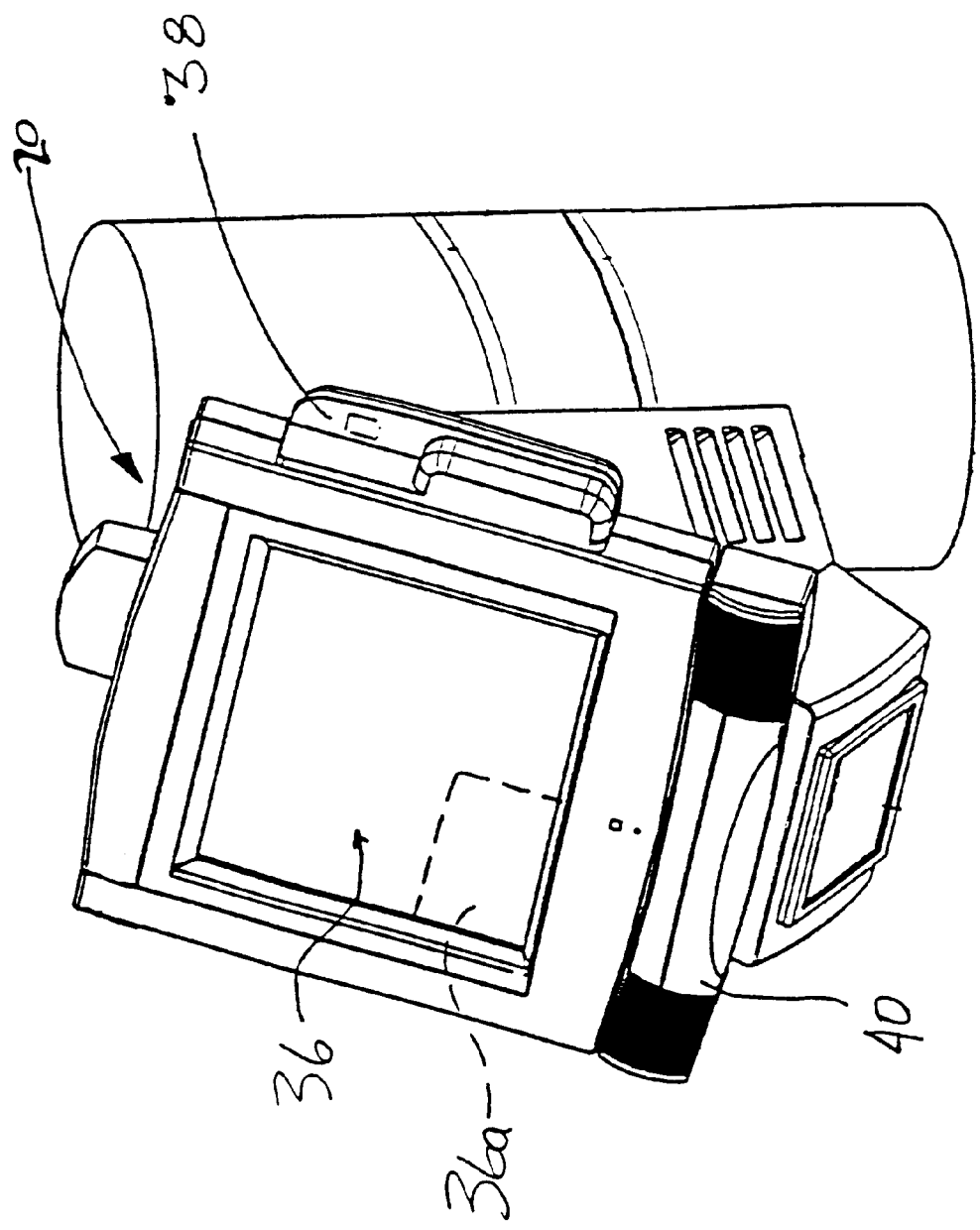
FIG. 3 is a perspective view of a consumer interactive terminal of the retail system of FIG. 1.

As shown in FIG. 3, the consumer interactive terminal 20 includes a display monitor 36, a card reader 38, and a speaker assembly 40. The card reader 38 may be any known magnetic strip reader including a credit and/or debit card reader, a loyalty card reader, or a smart card reader. It should be appreciated that a customer may swipe his or her loyalty, debit, credit, or smart card through the card reader 38 in order to identify the customer. The speaker assembly 40 may include any known pair of stereo loudspeakers. The speaker assembly 40 produces the audible sounds and tones associated with operation of the consumer interactive terminal 20 along with the audio messages associated with retail surveys and advertising messages.

The display monitor 36 may be any one of numerous known liquid crystal display (LCD) monitors. The display monitor 36 is provided to display various visual messages such as menus for use by a customer for submitting product information requests and data associated with the response to such product information requests or the like. In addition, the display monitor 36 may be used to display video messages such as advertising messages during periods of time in which the terminal 20 is not being used by a customer. Moreover, the display monitor 36 may be a known touch screen monitor that can generate data signals when certain areas of the screen are touched by a customer. It should be appreciated that such a configuration enables interactive operation of the terminal 20. One consumer interactive terminal which is suitable for use as the consumer interactive terminal 20 of the present invention is disclosed in U.S. patent application Ser. No. 09/070,501 (now U.S. Pat. No. 6,062,477) entitled "Apparatus and Method of Operating a Retail Terminal Having a Single-Orientation Base Assembly and a Multiple-Orientation Base Assembly" which was filed on Apr. 30, 1998, by Charles K. Wike, Jr. and Nathaniel C. Herwig, which is incorporated herein by reference, and which is assigned to the same assignee as the present invention.

In addition to facilitating the customer's operation of the consumer interactive terminal 20, the display monitor 36 may be utilized to display a an advertisement or a retail survey to the customer for the purpose of soliciting a response thereto. In particular, as shall be discussed below in more detail, a message may be displayed on a marketing portion 36a of the display screen associated with the display monitor 36 which advertises a product which may be of particular interest to the customer. Moreover, a retail survey, including a series of questions of particular interest to the customer, may be selectively displayed on the marketing portion 36a of the display screen associated with the display monitor 36 which solicits a response from the customer.

As shown in FIG. 1, the retail system 10 also includes a central server 42. Each of the retail terminals 12 communicates with the central server 42 via a network connection 44. The central server 42 has a mass storage device 46 associated therewith which maintains a number of databases associated with operation of the retail system 10. For example, the mass storage device 46 of the central server 42 maintains a master product database 48 which includes product information associated with each item sold by the retailer. For instance, if a customer scans or otherwise enters an item for purchase into one of the self-service checkout terminals 18, the processing unit associated with the terminal 18 communicates with the central server 42 in order to retrieve product information, such as pricing information, associated with the item from the master product database 48. Such product information is then communicated to the self-service checkout terminal 18 for purposes of completing the retail transaction such as calculating the total of the customer's items for purchase and printing a receipt.

Moreover, the mass storage device 46 associated with the central server 42 maintains a user profile database 50. The user profile database 50 includes retail information associated with a particular customer's previous use of the retail terminals 12. What is meant herein by the phrase "previous use" is a prior terminal session by a given customer in which the customer activated or otherwise "logged on" one of the retail terminals 12, completed a retail transaction, and thereafter deactivated or otherwise "logged off" the retail terminal 12. For example, if a customer checked out his or her items for purchase by use of the self-service checkout terminal 18 during the customer's visit to the retailer's store last week, such previous operation of the self-service checkout terminal 18 would be a previous use by the customer. Moreover, if while shopping at the retailer's store last week, a customer operated the consumer interactive terminal 20 in order to obtain product information associated with an item which the customer was contemplating for purchase, a record of the customer's operation of the consumer interactive retail terminal 20 would be stored in the user profile database 50 as a previous use associated with the customer. Yet further, if during the customer's visit to the retailer's store last week, a customer checked out his or her items for purchase through an assisted checkout terminal in which the customer's items for purchase were entered into the terminal by a clerk employed by the retailer, such previous operation of the assisted checkout terminal would be a previous use by the customer. In addition, if while shopping at the retailer's store last week, a customer operated a kiosk in order to obtain product information associated with an item which the customer was contemplating for purchase, a record of the customer's operation of the kiosk would be stored in the user profile database 50 as a previous use associated with the customer.

It should be appreciated from the above discussion that each time a customer purchases a particular item (either via the self-service checkout terminal 18 or an assisted checkout terminal), a record corresponding to the item is stored in the user profile associated with the customer in the user profile database 50. Moreover, each time a customer inquires about a particular item (either via the consumer interactive terminal 20 or a kiosk), a record corresponding to the item is also stored in a user profile associated with the customer in the user profile database 50. Hence, once the customer logs on to one of the retail terminals 12 by swiping his or her debit/credit card, loyalty card, or smart card through a card reader associated with the terminal 12 (e.g. the card reader 30 of the self-service checkout terminal 18, the card reader 38 of the consumer interactive terminal 20, or the card reader associated with either an assisted checkout terminal or a kiosk), the customer may be identified by the central server 42 for purposes of updating the user profile associated with the customer to include a record of items either purchased or inquired about by the customer during use of the retail terminal 12.

The retail information included in a given user profile may be organized and categorized in a number of different manners to fit the requirements of a given retailer or type of retail operation. For example, items may be categorized based on which department the items were purchased from in the retailer's store (e.g. the floral, meat, or deli departments). The items may be categorized based on the type of item (e.g. meat, snacks, soda, beer, etc.). The retail information may also be analyzed based on the customer's purchasing habits. For example, the retail information included in a given user profile may be sorted to determine the frequency in which a customer buys certain items such as snacks or beer. Hence, it should be appreciated that the retail information included in the user profiles of the user profile database 50 may be organized or categorized in numerous manners by those skilled in the art and that the above-discussion is merely exemplary in nature.

The mass storage device 46 associated with the central server 42 also maintains a promotion database 52. The promotion database 52 includes electronic files associated with various promotions or advertisements. In particular, the promotion database 52 includes electronic files which may be utilized to display a video and/or audio message on the retail terminals 12. Moreover, the promotion database 52 includes electronic files which may be utilized to print a printed message on the printers associated with the retail terminals 12. It should be appreciated that the promotion database 52 may include electronic files associated with promotions or advertisements for items sold by the retailer, services offered by the retailer, periodic sales or discounts, or even products or services offered by companies or organizations other than the retailer. For example, the promotion database 52 may include an electronic file associated with an advertisement for a particular brand of taco sauce, a new movie release being offered in the video department, a "2 for the price of 1" sale on bottles of soda, or an advertisement for a local real estate agent or mortgage company. In the case of advertisements for products or services offered by companies or organizations other than the retailer (e.g. the local real estate agent or mortgage company), the retailer may collect a fee for displaying the advertisements on the retail terminals 12. As shall be discussed below in more detail, the electronic files associated with the various promotions or advertisements included in the promotions database 52 define a "library" or "bank" of files which may be selectively drawn from in order to generate and display a customized advertising message for a given customer.

The mass storage device 46 associated with the central server 42 also maintains a survey database 54. The survey database 52 includes electronic files associated with various retail survey questions. In particular, the survey database 54 includes electronic files which may be utilized to display a video and/or audio survey on the retail terminals 12. It should be appreciated that the survey database 54 may include electronic files associated with survey questions relating to items sold by the retailer, services offered by the retailer, previous purchases by the customer, the quality or appearance of the store, or even products or services offered by companies or organizations other than the retailer. For example, the survey database 54 may include an electronic file associated with a survey question relating to a particular brand of snack chips, a new service or potential new service being offered by the retailer, the customer's perception of the retailer's store (e.g. cleanliness, helpfulness of employees, etc.), or a survey question relating to the business of a local real estate agent or mortgage company. As shall be discussed below in more detail, the electronic files associated with the various survey questions included in the survey database 54 define a "library" or "bank" of files which may be selectively drawn from in order to generate and display a customized survey for a given customer.

As shown in FIG. 1, the central server 42 is electrically coupled to an external network system 56 via a network connection 58. The external network system 56 may be located, for example, in a centralized office associated with the retailer and provides a centralized source for electronically updating the various databases associated with the central server 42 at each of the retailer's stores.

In operation, it should be appreciated that during a visit to the retailer's store, a customer will come into contact with numerous retail terminals (i.e. the retail terminals 12). For example, in the shopping area 19 of the retailer's store, the customer will encounter a number of the consumer information terminals 17, such as the consumer interactive terminal 20 or a kiosk, which the customer may use while selecting his or her items for purchase. The customer may swipe his or her loyalty card in the card reader associated with the terminal 17 (e.g. the card reader 38 of the consumer interactive terminal 20) in order to log on to the terminal 17. Thereafter, the customer may operate the terminal 17 in order to obtain product information or the like associated with an item or service offered by the retailer. For example, the customer may utilize the consumer interactive terminal 20 for the purpose of obtaining the price, description, or location within the store of a particular item offered by the retailer.

While retrieving the product information requested by the customer, the consumer information terminal 17 (e.g. the consumer interactive terminal 20) communicates with the central server 42 in order to retrieve the user profile associated with the customer. The user profile may then be used to generate a customized advertising message in the form of a video message which is displayed on the marketing portion of the terminal 17 (e.g. the marketing portion 36a of the screen associated with the display monitor 36 of the consumer interactive terminal 20). The customized advertising message may be targeted to "remind" the customer to buy a product he or she hasn't purchased lately. The customized advertising message may be targeted to a product which the customer inquired about during a previous use of one of the retail terminals 12. For example, if during a visit to the retailer's store the previous week, the customer inquired about a particular brand of bubble gum via use of the consumer interactive terminal 20, a record associated with the bubble gum product request would be stored in the user profile associated with customer. Hence, during the current use of the terminal 20, an advertising message relating to the particular type of bubble gum may be displayed on the marketing portion 36a of the screen associated with the display monitor 36. As described above, various criteria may be utilized by the retailer to determine which customized advertising message should be displayed on the marketing portion 36a of the display monitor 36. Moreover, if the given consumer information terminal 17 (e.g. the consumer interactive terminal 20) being operated by the customer includes a printer, a customized incentive voucher may be printed for the customer. For example, referring again to the case where the customer previously requested information about a particular type of bubble gum, an incentive voucher may be printed which offers a special price on the purchase of the bubble gum.

Moreover, the user profile may be used to generate a customized retail survey in the form of a video message containing a number of questions which are displayed on the marketing portion of the terminal 17 (e.g. the marketing portion 36a of the display monitor 36 of the consumer interactive terminal 20). The customized retail survey may be targeted to solicit a response from the customer relating the customer's impression of an item that the customer purchased during his previous visit to the retailer's store. For example, if during the customer's previous visit to the retailer's store the customer bought a particular type of beer, a survey question may be displayed on the marketing portion 36a of the display monitor 36 which solicits the customer's opinion as to if or if not the customer would again consider purchasing the same type of beer. It should be appreciated that an incentive voucher may be offered to the customer for answering the question associated with the retail survey. For example, if the customer answers the question associated with the particular type of beer he or she previously purchased, a coupon may be printed for a discount on a subsequent purchase of additional beer. The customized survey may also be targeted to a service which the customer utilized during a previous visit to the retailer's store. For example, if during a visit to the retailer's store the previous week, the customer rented movies from the video department, a record associated with the movie rental would be stored in the customer's user profile. Hence, during the current use of the terminal 20, a survey question relating to the pleasantness of the customer's experience in the video department may be displayed on the marketing portion 36a of the display monitor 36. As described above, various criteria may be utilized by the retailer to determine which customized survey questions should be displayed on the marketing portion 36a of the display monitor 36.

It should be appreciated that a record is made corresponding to the customer's use of the consumer information terminal 17. In particular, the central server 42 communicates with the mass storage device 46 to create a record associated with the customer's use of the terminal 17 in the customer's user profile. For example, if during operation of the consumer interactive terminal 20 the customer enters a request for product information associated with a particular type of cereal, the central server 42 communicates with the mass storage device 46 in order to cause the storage device 46 to update the customer's user profile in the user profile database 50 to include a record associated with the customer's request for product information associated with the particular type of cereal.

Once the customer has selected all of his or items for purchase from the shopping area 19, the customer will proceed to the checkout area 15 of the retailer's store such that the customer may checkout his or her items for purchase and tender payment for the same. In the checkout area 15, the customer may opt to either checkout his or her items for purchase via use of either the self-service checkout terminal 18 or an assisted checkout terminal being operated by a clerk employed by the retailer. For purposes of the following discussion, operation of the self-service checkout terminal 18 will be described in detail; however, it should be appreciated that an assisted checkout terminal may be operated in a similar manner.

Upon arrival of the customer at the self-service checkout terminal 18, the terminal 18 may be activated by the customer swiping his or her debit, credit, loyalty, or smart card through the card reader 30. Once activated, the self-service checkout terminal 18 communicates with the central server 42 in order to retrieve the user profile associated with the customer. Thereafter, the customer may begin to scan or otherwise enter his or her items for purchase into the self-service checkout terminal 18 via use of the scanner 14 or the data input device 24 (e.g. a keypad or touch pad). If an item for purchase is properly scanned or otherwise entered into the self-service checkout terminal 18, an item-entered control signal is generated and record of the entered item is made in a transaction table for purposes of generating a grocery bill and receipt at the end of the checkout transaction. Moreover, in response to generation of the item-entered control signal, the user profile database 50 is updated. In particular, the central server 42 communicates with the mass storage device 46 to create a record associated with the scanned item in the customer's user profile contained in the user profile database 50. For example, if the customer scans a box detergent, the central server 42 communicates with the mass storage device 46 thereby causing the storage device 46 to update the customer's user profile in the user profile database 50 to include a record associated with the particular type of detergent.

Figure 4:
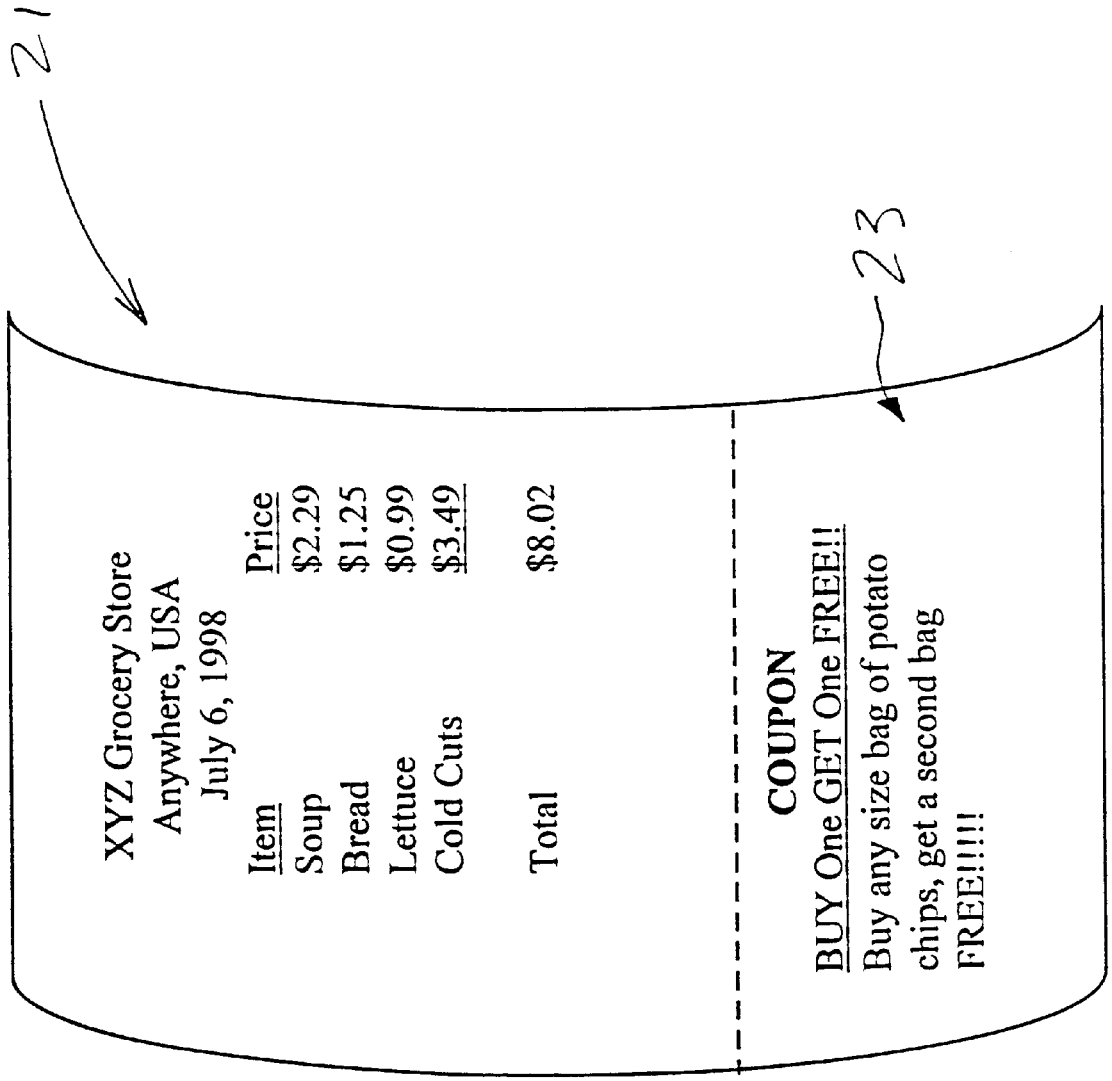
FIG. 4 is a view showing a receipt having an incentive voucher printed thereon which may be printed by the self-service checkout terminal of FIG. 2.

Concurrently with operation of the self-service checkout terminal 18 to allow the customer to scan or otherwise enter items for purchase in the manner described above, the retrieved user profile may also be used to generate a customized advertising message in the form of a video message which is displayed on the marketing portion 22a of the screen associated with the display monitor 22 of the self-service checkout terminal 18. The customized advertising message may be targeted to "remind" the customer to buy a product he or she hasn't purchased lately. The customized advertising message may be targeted to a product which the customer inquired about during a previous use of one of the retail terminals 12. For example, if while shopping in the shopping area 19 prior to checking out, the customer inquired about a particular brand of bubble gum via use of the consumer interactive terminal 20, a record associated with the bubble gum product request would have been stored in the user profile associated with customer. Hence, during operation of the self-service checkout terminal 18, an advertising message relating to the particular type of bubble gum may be displayed on the marketing portion 22a of the screen associated with the display monitor 22. As described above, various criteria may be utilized by the retailer to determine which customized advertisement should be displayed on the marketing portion 22a of the display monitor 22 during operation of the self-service checkout terminal 18. Moreover, a customized incentive voucher may be printed for the customer with the printer 32. For example, referring again to the case where the customer previously requested information about a particular type of bubble gum, an incentive voucher may be printed which offers a special price on the purchase of the bubble gum. In addition, as shown in FIG. 4, the incentive voucher may be printed on the customer's receipt. In particular, at the end of the customer's checkout transaction, a receipt 21 is printed for the customer as a record of his or her transaction. The customized incentive voucher may be printed on the receipt 21 in the form of a coupon 23 in order to entice the customer to buy a targeted item (e.g. potato chips) during his or her subsequent visit to the retailer's store.

Moreover, the retrieved user profile may be used to generate a customized retail survey in the form of a video message containing a number of questions which are displayed on the marketing portion 22a of the display monitor 22 as the customer scans or otherwise enters items for purchase into the self-service checkout terminal 18. The customized retail survey may be targeted to solicit a response from the customer relating the customer's impression of an item that the customer purchased during his previous visit to the retailer's store or an item that the customer obtained information about from the consumer interactive terminal 20 while shopping prior to checking out his or her items for purchase. For example, if during the customer's previous visit to the retailer's store the customer bought a particular type of beer, a survey question may be displayed on the marketing portion 22a of the display monitor 22 which solicits the customer's opinion as to if or if not the customer would again consider purchasing the same type of beer. It should be appreciated that an incentive voucher may be offered to the customer for answering the question associated with the retail survey. For example, if the customer answers the question associated with the particular type of beer he or she previously purchased, a coupon may be printed with the printer 32 for a discount on a subsequent purchase of additional beer. The customized survey may also be targeted to a service which the customer utilized during a previous visit to the retailer's store. For example, if during a visit to the retailer's store the previous week, the customer rented movies from the video department, a record associated with the movie rental would be stored in the customer's user profile. Hence, while entering items into the terminal 18, a survey question relating to the pleasantness of the customer's experience in the video department may be displayed on the marketing portion 22a of the display monitor 22. Moreover, the retailer may desire to solicit a response from the customer as to the possibility of adding new services or departments to the retailer's operation. For example, if the retailer is considering adding a fresh seafood department, the retailer may direct a survey question to customers which currently buy frozen or pre-packaged seafood products on a regular basis. Moreover, survey questions of a general nature may also be displayed on the marketing portion 22a of the display monitor 22 during operation of the self-service checkout terminal 18. For example, the retailer may desire to solicit a response as to the general cleanliness of the store or friendliness of the employees. Such general questions are particularly useful in the case of a first time customer who does not yet have a user profile associated therewith. However, as described above, various criteria may be utilized by the retailer to determine which customized survey questions should be displayed on the marketing portion 22a of the display monitor 22 with the above-discussion being exemplary in nature.

It should be appreciated that the number of questions included in a given retail survey displayed on the marketing portion 22a of the display monitor 22 may be altered based on usage of the self-service checkout terminal 18. For example, during periods of relatively high usage of the self-service checkout terminal 18, the number of questions in a given retail survey may be reduced in order to enhance throughput through the terminal 18. However, during periods of relatively low usage of the self-service checkout terminal 18, the number of questions in a given retail survey may be increased in order to increase the number of responses received from a given customer.

Figure 5:
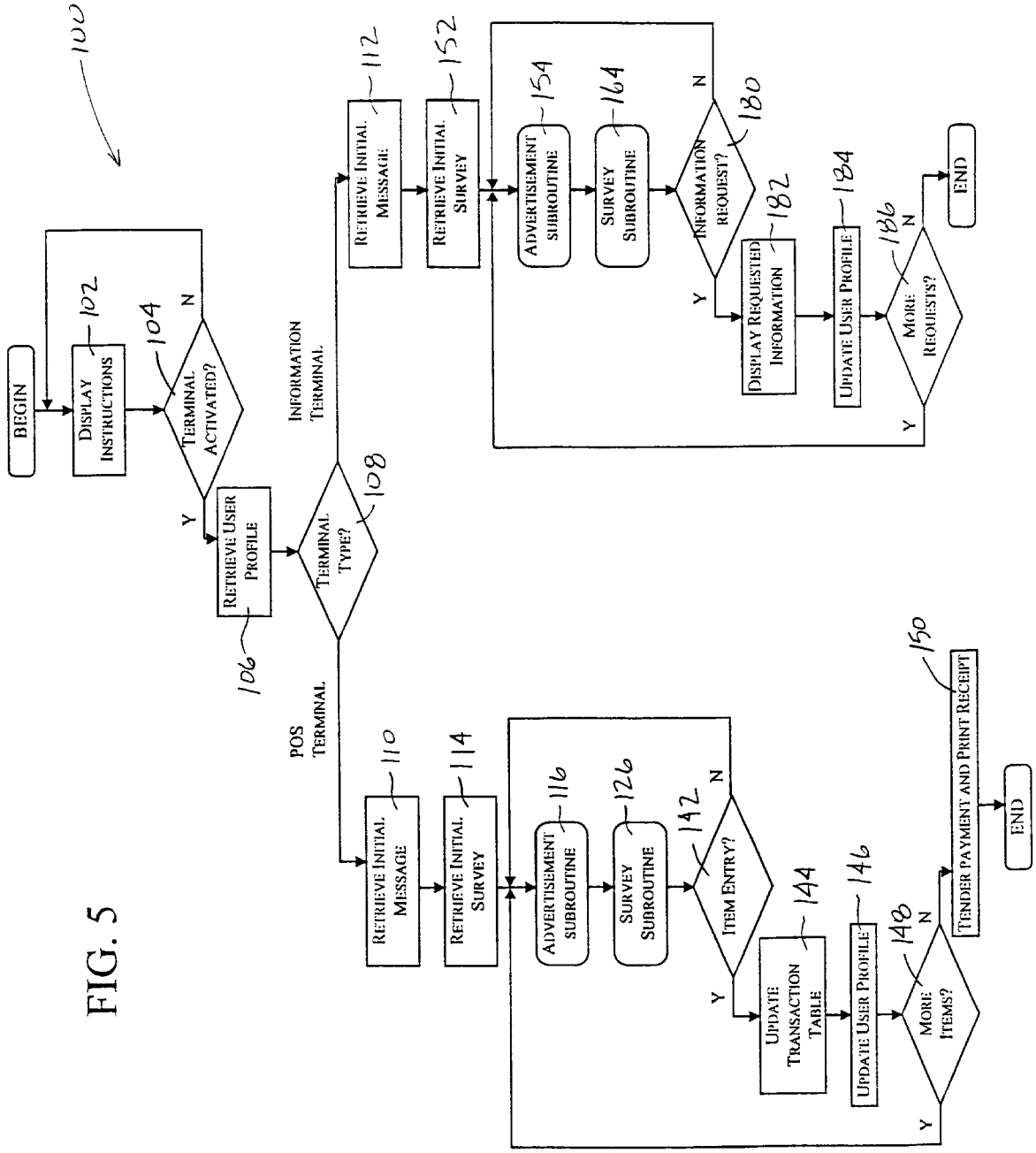
FIG. 5 is a flowchart which sets forth a general procedure for operating the retail system of FIG. 1.

Referring now to FIG. 5, a flowchart sets forth a general procedure or routine 100 for operating the retail system 10 of the present invention. The routine 100 begins with step 102 in which a message is displayed on the display monitor 32 which instructs the customer to identify himself or herself by swiping his or her credit, debit, loyalty, or smart card through the card reader associated with one of the retail terminals 12 (e.g. the card reader 30 of the self-service checkout terminal 18 or the card reader 38 of the consumer interactive terminal 20). It should be appreciated that the display monitor associated with the retail terminal 12 may be utilized to display a non-customized advertisement prior to being activated by the customer. The routine 100 then advances to step 104.

In step 104, the central server 42 determines if one of the retail terminals 12 is activated by a customer. In particular, the central server 42 determines if a customer has swiped his or her credit, debit, loyalty, or smart card through a card reader associated with one of the retail terminals 12 in order to activate the same. If one of the retail terminals 12 has been activated, the routine 100 advances to step 106. If one of the retail terminals 12 has not been activated, the routine 100 loops back to step 102 until subsequent activation of one of the retail terminals 12 by a customer.

In step 106, the central server 42 retrieves the user profile associated with the customer. In particular, the central server 42 communicates with the mass storage device 46 in order to retrieve the customer's user profile from the user profile database 50. Thereafter, the routine 100 advances to step 108.

In step 108, the central server 42 determines whether the retail terminal 12 that was activated by the customer in step 104 is a point-of-sale terminal 13 (i.e. the self-service checkout terminal 18 or an assisted checkout terminal) or a consumer information terminal 17 (i.e. the consumer interactive terminal 20 or a kiosk). If the retail terminal 12 activated in step 104 is a point-of-sale terminal 13, the routine 100 advances to step 110. If the retail terminal 12 activated in step 104 is a consumer information terminal 17, the routine 100 advances to step 112.

In step 110, the central server 42 retrieves an electronic file associated with a customized advertising message. In particular, the central server 42 communicates with the mass storage device 46 in order to retrieve a customized advertising message from the promotion database 52 based on information included in the customer's user profile. As discussed above, the promotion database 52 includes electronic files which may be utilized to display a video and/or audio message on the retail terminals 12. Moreover, the promotion database 52 includes electronic files which may be utilized to print a printed message on the printers associated with the retail terminals 12. It should be appreciated that the promotion database 52 may include electronic files associated with promotions or advertisements for items sold by the retailer, services offered by the retailer, periodic sales or discounts, or even products or services offered by companies or organizations other than the retailer. For example, the promotion database 52 may include an electronic file associated with an advertisement for a particular brand of taco sauce, a new movie release being offered in the video department, a "2 for the price of 1" sale on bottles of soda, or an advertisement for a local real estate agent or mortgage company. The electronic files associated with the various promotions or advertisements included in the promotions database 52 define a "library" or "bank" of files which may be selectively drawn from in order to generate and display a customized advertising message for a given customer based upon the information included in the customer's user profile.

In particular, the information included in the customer's user profile may be used to generate a customized advertising message in the form of a video message which is displayed on the marketing portion 22a of the display monitor 22 of the self-service checkout terminal 18. The customized advertising message may be targeted to "remind" the customer to buy a product he or she hasn't purchased lately. The customized advertising message may be targeted to a product which the customer inquired about during a previous use of one of the retail terminals 12. For example, if while shopping in the shopping area 19 prior to checking out, the customer inquired about a particular brand of bubble gum via use of the consumer interactive terminal 20, a record associated with the bubble gum product request would have been stored in the user profile associated with customer. Hence, during operation of the self-service checkout terminal 18, an advertising message relating to the particular type of bubble gum may be displayed on the marketing portion 22a of the display monitor 22. As described above, various criteria may be utilized by the retailer to determine which customized advertising message should be displayed on the marketing portion 22a of the display monitor 22 during operation of the self-service checkout terminal 18. Moreover, a customized incentive voucher may be printed for the customer with the printer 32. For example, referring again to the case where the customer previously requested information about a particular type of bubble gum, an incentive voucher may be printed which offers a special price on the purchase of the bubble gum. In addition, as shown in FIG. 4, the incentive voucher may be printed on the customer's receipt 21. In particular, at the end of the customer's checkout transaction, the receipt 21 is printed for the customer as a record of his or her transaction. The customized incentive voucher may be printed on the receipt 21 in the form of the coupon 23 in order to entice the customer to buy the targeted item (e.g. potato chips) during his or her subsequent visit to the retailer's store. Once the electronic file associated with a customized advertising message has been retrieved from the promotion database 52 by the central server 42, the routine 100 advances to step 114.

In step 114, the central server 42 retrieves an electronic file associated with a customized retail survey. In particular, the central server 42 communicates with the mass storage device 46 in order to retrieve a customized retail survey from the survey database 54 based on information included in the customer's user profile. As discussed above, the survey database 54 includes electronic files which may be utilized to display a video and/or audio survey on the retail terminals 12. It should be appreciated that the survey database 54 may include electronic files associated with survey questions relating to items sold by the retailer, services offered by the retailer, previous purchases by the customer, the quality or appearance of the store, or even products or services offered by companies or organizations other than the retailer. For example, the survey database 54 may include an electronic file associated with a survey question relating to a particular brand of snack chips, a new service or potential new service being offered by the retailer, the customer's perception of the retailer's store (e.g. cleanliness, helpfulness of employees, etc.), or a survey question relating to the business of a local real estate agent or mortgage company. The electronic files associated with the various survey questions included in the survey database 54 define a "library" or "bank" of files which may be selectively drawn from in order to generate and display a customized survey for a given customer.

In particular, the retrieved user profile may be used to generate a customized retail survey in the form of a video message containing a number of questions which are displayed on the marketing portion 22a of the display monitor 22 as the customer scans or otherwise enters items for purchase into the self-service checkout terminal 18. The customized retail survey may be targeted to solicit a response from the customer relating the customer's impression of an item that the customer purchased during his previous visit to the retailer's store or an item that the customer obtained information about from the consumer interactive terminal 20 while shopping in the shopping area 19 prior to checking out his or her items for purchase. For example, if during the customer's previous visit to the retailer's store the customer bought a particular type of beer, a survey question may be displayed on the marketing portion 22a of the display monitor 22 which solicits the customer's opinion as to if or if not the customer would again consider purchasing the same type of beer. It should be appreciated that an incentive voucher may be offered to the customer for answering the question associated with the retail survey. For example, if the customer answers the question associated with the particular type of beer he or she previously purchased, a coupon may be printed with the printer 32 for a discount on a subsequent purchase of additional beer. The customized survey may also be targeted to a service which the customer utilized during a previous visit to the retailer's store. For example, if during a visit to the retailer's store the previous week, the customer rented movies from the video department, a record associated with the movie rental would be stored in the customer's user profile. Hence, while entering items into the terminal 18, a survey question relating to the pleasantness of the customer's experience in the video department may be displayed on the marketing portion 22a of the display monitor 22. Moreover, the retailer may desire to solicit a response from the customer as to the possibility of adding new services or departments to the retailer's operation. For example, if the retailer is considering adding a fresh seafood department, the retailer may direct a survey question to customers which currently buy frozen or pre-packaged seafood products on a regular basis. Moreover, survey questions of a general nature may also be displayed on the marketing portion 22a of the display monitor 22 during operation of the self-service checkout terminal 18. For example, the retailer may desire to solicit a response as to the general cleanliness of the store or friendliness of the employees. Such general questions are particularly useful in the case of a first time customer who does not yet have a user profile associated therewith. However, as described above, various criteria may be utilized by the retailer to determine which customized survey questions should be displayed on the marketing portion 22a of the display monitor 22 with the above-discussion being exemplary in nature. Once the electronic file associated with a customized retail survey has been retrieved from the survey database 54 by the central server 42, the routine 100 advances to an advertisement subroutine 116.

Figure 6:
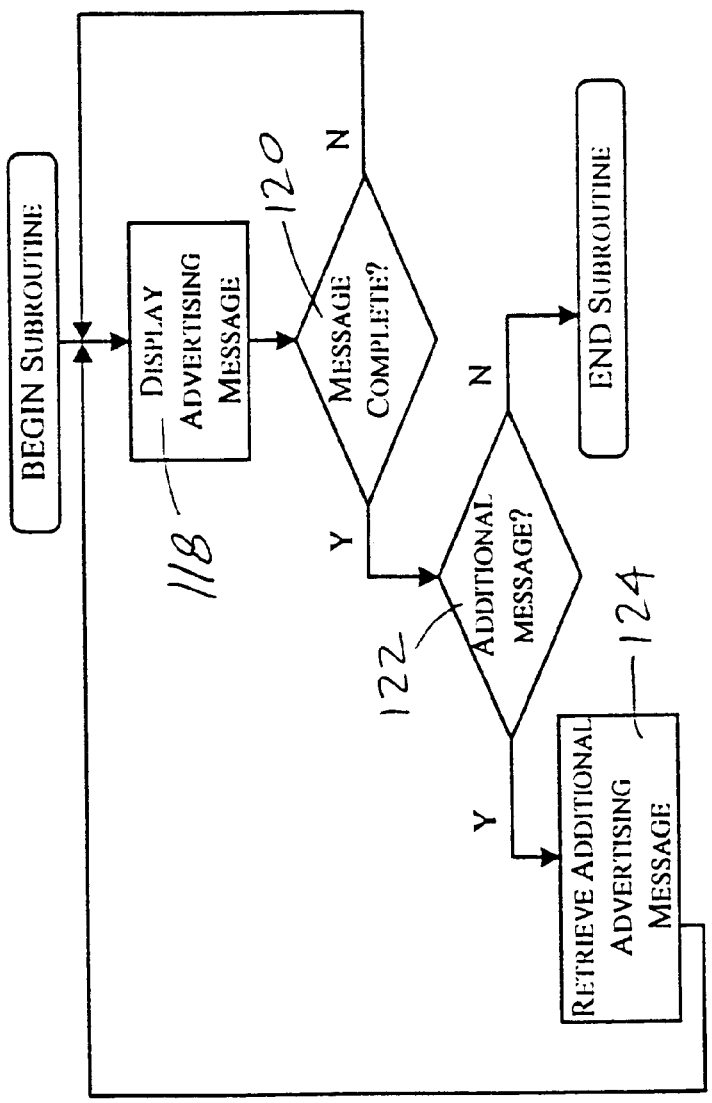
FIG. 6 is a flowchart which sets forth a point-of-sale advertisement subroutine of the general procedure of FIG. 5.

As shown in FIG. 6, the subroutine 116 begins with step 118 in which the customized advertising message is displayed on the marketing portion 22a of the screen associated with the display monitor 22. In particular, the central server 42 transmits or otherwise communicates the retrieved electronic file associated with the customized advertising message to the self-service checkout terminal 18 such that the video and/or audio advertising message associated with the retrieved file may be displayed on the marketing portion 22a of the display monitor 22. Moreover, if the customized advertising message includes information in the form of an incentive voucher, the central server 42 transmits or otherwise communicates the retrieved electronic file associated with the customized advertising message to the self-service checkout terminal 18 such that the incentive voucher associated with the retrieved file is printed with the printer 32. The subroutine 116 then advances to step 120.

In step 120, the central server 42 determines if playback of the advertising message is complete. In particular, the self-service checkout terminal 18 generates an output signal which is sent to the central server 42 when the entire customized advertising message has been displayed by the terminal 18. If the advertising message has be displayed completely by the self-service checkout terminal 18, the subroutine 116 advances to step 122. If playback of the advertising message is not yet complete, the subroutine 116 loops back to step 118 to continue display of the advertising message.

In step 122, the central server 42 determines if an additional advertising message is to be displayed on the self-service checkout terminal 18. In particular, the retailer may configure the retail system 10 such that advertising messages are displayed during the entire checkout operation, or alternatively, the retailer may elect to only display a predetermined number of messages during a given transaction. Hence, in step 122, if an additional advertising message is to displayed on the self-service checkout terminal 18, the subroutine 116 advances to step 124. If no additional advertising messages are to be displayed on the self-service checkout terminal 18, the subroutine 116 then ends thereby advancing the routine 100 (see FIG. 5) to a survey subroutine 126.

In step 124, the central server 42 retrieves an electronic file associated with an additional customized advertising message. In particular, the central server 42 communicates with the mass storage device 46 in order to retrieve an additional customized advertising message from the promotion database 52 based on information included in the customer's user profile in the manner previously discussed in regard to step 110. The subroutine 116 then loops back to step 118 to display the additional advertising message in the manner previously discussed.

Figure 7:
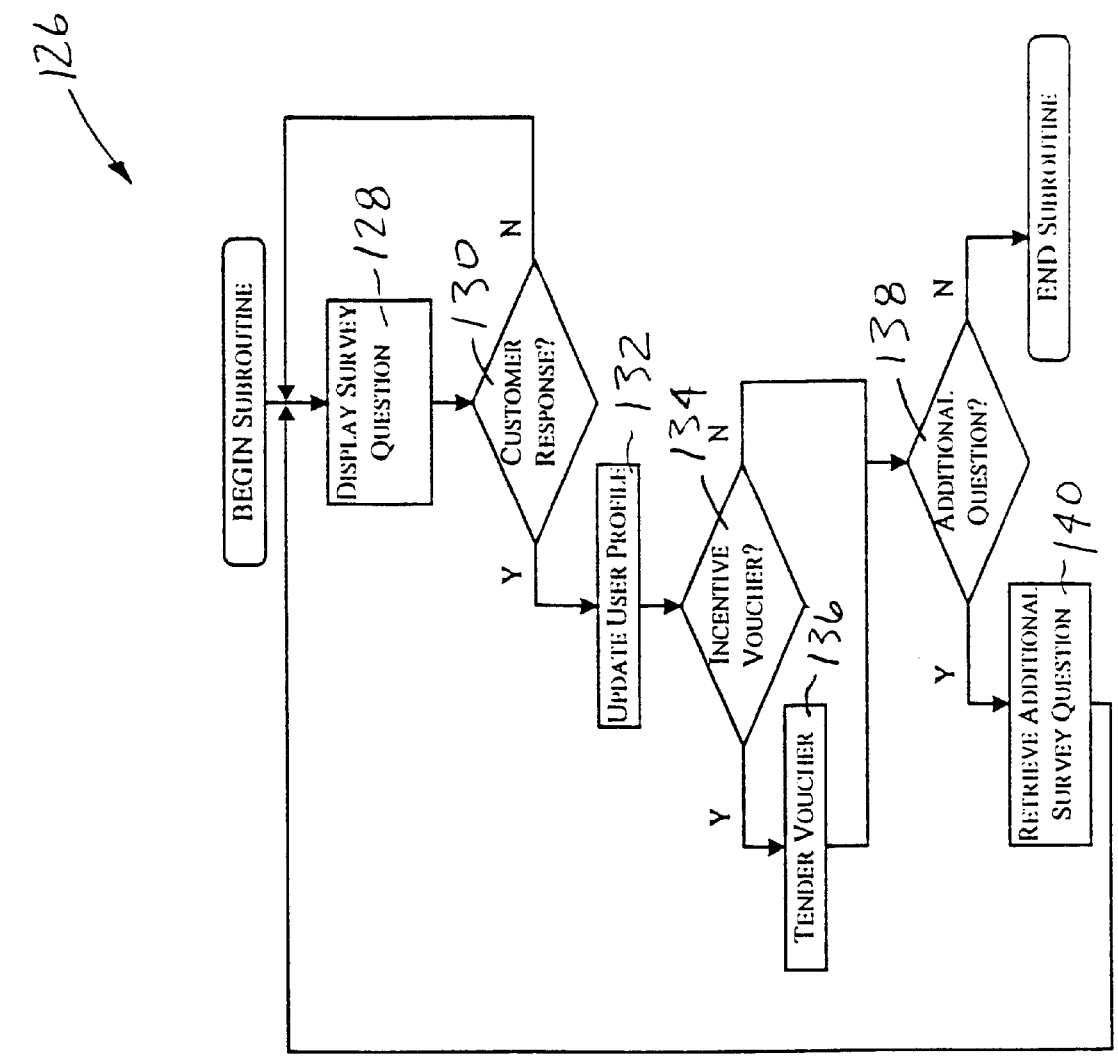
FIG. 7 is a flowchart which sets forth a point-of-sale survey subroutine of the general procedure of FIG. 5.

Returning now to step 122, if no additional advertising messages are to be displayed on the self-service checkout terminal 18, the subroutine 116 then ends thereby advancing the routine 100 (see FIG. 5) to the survey subroutine 126. As shown in FIG. 7, the subroutine 126 begins with step 128 in which the customized retail survey is displayed on the marketing portion 22a of the display monitor 22. In particular, the central server 42 transmits or otherwise communicates the retrieved electronic file associated with the customized retail survey to the self-service checkout terminal 18 such that the retail survey associated with the retrieved file is displayed on the marketing portion 22a of the screen associated with the display monitor 22. It should be appreciated that the retail survey may be displayed in conjunction (i.e. concurrently) with an advertising message, or alternatively the retail survey may be cued by the processing unit associated with the self-service checkout terminal 18 for display upon completion of the advertising message. In particular, priority between displaying the advertising message or the retail survey may be established by the retailer to fit the particular needs of a given retail system 10. The subroutine 126 then advances to step 130.

In step 130, the central server 42 determines if the customer has entered a response to the displayed retail survey question. In particular, the processing unit associated with the self-service checkout terminal 18 generates an output signal which is sent to the central server 42 when the customer touches a particular area of the touch screen associated with the display monitor 22 or touches a particular key associated with the data input device 24. If the customer enters a response to the displayed retail survey question, the subroutine 126 advances to step 132. If the customer has not yet entered a response to the displayed retail survey question, the subroutine 126 loops back to step 128 to continue displaying the retail survey question to the customer.

In step 132, the central server 42 updates the customer's user profile in the user profile database 50. In particular, the central server 42 communicates with the mass storage device 46 such that a record associated with the customer's response to the retail survey question is included in the customer's user profile for subsequent use by the retail system 10. It should also be appreciated that a separate database may also be updated to add the customer's response to the responses from other customers to the same survey question. The subroutine 126 then advances to step 134.

In step 134, the central server 42 determines if an incentive voucher is to be presented to the customer due to his or her response to the displayed survey question. In particular, as discussed above, an incentive voucher may be offered to the customer for answering the question or questions associated with the retail survey. For example, if the customer answers the questions associated with the particular type of beer he or she previously purchased, a coupon may be printed for a discount on a subsequent purchase of additional beer. It should be appreciated that the retailer may configure the retail system 10 so as to determine if or when an incentive voucher is to be offered to the customer. Hence, if the central server 42 determines that an incentive voucher is to be offered to the customer, the subroutine 126 advances to step 136. If the central server determines that an incentive offer is not to be offered to the customer, the subroutine 126 advances to step 138.

In step 136, the self-service checkout terminal 18 tenders the incentive voucher to the customer. In particular, the incentive voucher may be printed with the printer 32. Moreover, the amount of the incentive voucher may be electronically deducted from the total amount of the customer's items for purchase thereby eliminating the need to print the incentive voucher. Once the incentive voucher has been tendered, the subroutine 126 advances to step 138.

In step 138, the central server 42 determines if an additional retail survey question is to be displayed on the self-service checkout terminal 18. In particular, as described above, the number of questions included in a given retail survey may be altered based on usage of the self-service checkout terminal 18. For example, during periods of relatively high usage of the self-service checkout terminal 18, the number of questions in a given retail survey may be reduced in order to enhance throughput through the terminal 18. However, during periods of relatively low usage of the self-service checkout terminal 18, the number of questions in a given retail survey may be increased in order to increase the number of responses received from a given customer. Moreover, the retailer may configure the retail system 10 such that questions associated with a retail survey are displayed during the entire checkout operation, or alternatively, the retailer may elect to only display a predetermined number of questions during a given transaction. Hence, in step 138, if an additional retail survey question is to be displayed on the self-service checkout terminal 18, the subroutine 126 advances to step 140. If no additional retail survey questions are to be displayed on the self-service checkout terminal 18, the subroutine 126 then ends thereby advancing the routine 100 (see FIG. 5) to step 142.

In step 140, the central server 42 retrieves an electronic file associated with an additional customized retail survey question. In particular, the central server 42 communicates with the mass storage device 46 in order to retrieve an additional customized retail survey question or questions from the survey database 54 based on information included in the customer's user profile in the manner previously discussed in regard to step 114. The subroutine 126 then loops back to step 128 to display the additional retail survey question or questions in the manner previously discussed.

Returning now to discussion of the routine 100 (see FIG. 5), in step 142 the processing unit associated with the self-service checkout terminal 18 determines whether an item has been entered into the terminal 18. In particular, the processing unit determines if (1) the scanner 14 has successfully read or otherwise captured the product identification code associated with an item, (2) the product identification code associated with an item has been entered via the touch screen portion of the display monitor 22, or (3) the product identification code associated with an item has been entered via the data input device 24. More specifically, the scanner 14 generates an output signal which is sent to the processing unit of the terminal 18 once the scanner 14 successfully reads the product identification code associated with the item. Similarly, the display monitor 22 and the data input device 24 generate an output signal which is sent to the processing unit of the terminal 18 once the product identification code has been entered by the customer. If an item is successfully entered into the self-service checkout terminal 18, an item-entered control signal is generated and the routine 100 advances to step 144. If an item is not successfully entered into the self-service checkout terminal 18, the item-entered control signal is not generated, and the routine 100 loops back to the advertisement subroutine 116 to continue displaying the advertising message and/or the retail survey. Hence, it should be appreciated that the advertising message and/or the retail survey are displayed on the marketing portion 32a of the screen associated with the display monitor 32 during the timer period in which the customer is entering items into the self-service checkout terminal 18.

In step 144, the processing unit associated with the terminal 18 adds a record of the item entered in step 142 to a transaction table. In particular, the processing unit communicates with the central server 42 to obtain product information (e.g. description and price) associated with the entered item from the master product database 48. Thereafter, the processing unit of the terminal 18 updates the transaction table. More specifically, the processing unit generates an output signal which causes the transaction table to be updated to include the product information associated with the entered item. It should be appreciated that the contents of the transaction table are used by the self-service checkout terminal 18 for purposes of generating a grocery bill and the receipt 21 at the end of the transaction. The routine 100 then advances to step 146.

In step 146, the central server 42 updates the customer's user profile in the user profile database 50. In particular, the central server 42 communicates with the mass storage device 46 such that a record associated with the item scanned or otherwise entered by the customer is included in the customer's user profile for subsequent use by the retail system 10. The routine 100 then advances to step 148.

In step 148, the processing unit associated with the self-service checkout terminal 18 monitors output from the data input device 24 and the display monitor 22 in order to determine whether there are more items to be entered. In particular, a message is displayed on the display monitor 22 instructing the customer to touch a particular touch screen area displayed on the display monitor 22, or to touch a particular key associated with the data input device 24, when the customer has completed entering all of his or her items for purchase.

If a particular output is detected from either the data input device 24 or the display monitor 22, the terminal 18 determines that the checkout procedure is complete and the routine 100 advances to step 150. If a particular output is not detected from either the data input device 24 or the display monitor 22, the terminal 18 determines that the customer has additional items for purchase, and the routine 100 returns to the subroutine 116 in order to continue displaying an advertising message and/or a retail survey during entry of subsequent items into the self-service checkout terminal 18.

In step 150 self-service checkout terminal 18 is operated so as to allow the customer to tender payment for his or her items for purchase. In particular, the card reader 30 or a currency acceptor (not shown) generates a payment-tendered control signal when the customer either (1) charges a credit card or debit card account or decreases a value amount stored on a smart card via the card reader 30, or (2) inserts currency into a currency acceptor, respectively. Once the payment-tendered control signal has been generated, the printer 32 is utilized to print a receipt 21 associated with the customer's transaction. As discussed above, and shown in FIG. 4, a customized incentive voucher may be printed on the customer's receipt 21. The customized incentive voucher may be printed on the receipt 21 in the form of coupon 23 in order to entice the customer to buy a targeted item (e.g. potato chips) during his or her subsequent visit to the retailer's store which is selected based upon the retail information in the customer's user profile.

Returning now to step 108, if the retail terminal 12 activated in step 104 is one of the consumer information terminals 17 (e.g. the consumer interactive terminal 20 or a kiosk), the routine 100 advances to step 112. The following discussion relating to operation of a consumer information terminal 17 will include discussion particular to operation of the consumer interactive terminal 20; however, it should be appreciated that operation of numerous other types of consumer information terminals 17 (e.g. a kiosk) is contemplated in a similar manner.

In step 112, the central server 42 retrieves an electronic file associated with a customized advertising message. In particular, the central server 42 communicates with the mass storage device 46 in order to retrieve a customized advertising message from the promotion database 52 based on information included in the customer's user profile. As discussed above, the promotion database 52 includes electronic files which may be utilized to display a video and/or audio message on the retail terminals 12. Moreover, the promotion database 52 includes electronic files which may be utilized to print a printed message on the printers associated with the retail terminals 12. It should be appreciated that the promotion database 52 may include electronic files associated with promotions or advertisements for items sold by the retailer, services offered by the retailer, periodic sales or discounts, or even products or services offered by companies or organizations other than the retailer. For example, the promotion database 52 may include an electronic file associated with an advertisement for a particular brand of taco sauce, a new movie release being offered in the video department, a "2 for the price of 1" sale on bottles of soda, or an advertisement for a local real estate agent or mortgage company. The electronic files associated with the various promotions or advertisements included in the promotions database 52 define a "library" or "bank" of files which may be selectively drawn from in order to generate and display a customized advertising message for a given customer based upon the information included in the customer's user profile.

In particular, the information included in the customer's user profile may be used to generate a customized advertising message in the form of a video message which is displayed on the marketing portion 36a of the screen associated with the display monitor 36 of the consumer interactive terminal 20. The customized advertising message may be targeted to "remind" the customer to buy a product he or she hasn't purchased lately. The customized advertising message may be targeted to a product which the customer inquired about during a previous use of one of the retail terminals 12. For example, if while shopping prior to checking out, the customer inquired about a particular brand of bubble gum via use of the consumer interactive terminal 20, a record associated with the bubble gum product request would have been stored in the user profile associated with the customer. Hence, during operation of the consumer interactive terminal 20, an advertising message relating to the particular type of bubble gum may be displayed on the marketing portion 36a of the display monitor 36. As described above, various criteria may be utilized by the retailer to determine which customized advertising message should be displayed on the marketing portion 36a of the display monitor 36 during operation of the consumer interactive terminal 20. Once the electronic file associated with a customized advertising message has been retrieved from the promotion database 52 by the central server 42, the routine 100 advances to step 152.

In step 152, the central server 42 retrieves an electronic file associated with a customized retail survey. In particular, the central server 42 communicates with the mass storage device 46 in order to retrieve a customized retail survey from the survey database 54 based on information included in the customer's user profile. As discussed above, the survey database 54 includes electronic files which may be utilized to display a video and/or audio survey on the retail terminals 12. It should be appreciated that the survey database 54 may include electronic files associated with survey questions relating to items sold by the retailer, services offered by the retailer, previous purchases by the customer, the quality or appearance of the store, or even products or services offered by companies or organizations other than the retailer. For example, the survey database 54 may include an electronic file associated with a survey question relating to a particular brand of snack chips, a new service or potential new service being offered by the retailer, the customer's perception of the retailer's store (e.g. cleanliness, helpfulness of employees, etc.), or a survey question relating to the business of a local real estate agent or mortgage company. The electronic files associated with the various survey questions included in the survey database 54 define a "library" or "bank" of files which may be selectively drawn from in order to generate and display a customized retail survey for a given customer.

In particular, the retrieved user profile may be used to generate a customized retail survey in the form of a video message containing a number of questions which are displayed on the marketing portion 36a of the screen associated with the display monitor 36 of the consumer interactive terminal 20 as the customer utilizes the terminal 20 to obtain product information or the like. The customized retail survey may be targeted to solicit a response from the customer relating the customer's impression of an item that the customer purchased during his previous visit to the retailer's store. For example, if during the customer's previous visit to the retailer's store the customer bought a particular type of beer, a survey question may be displayed on the marketing portion 36a of the screen associated with the display monitor 36 which solicits the customer's opinion as to if or if not the customer would again consider purchasing the same type of beer. It should be appreciated that an incentive voucher may be offered to the customer for answering the question or questions associated with the retail survey. For example, if the customer answers the questions associated with the particular type of beer he or she previously purchased, a coupon may be printed with a printer associated with the terminal 20 for a discount on a subsequent purchase of additional beer. The customized survey may also be targeted to a service which the customer utilized during a previous visit to the retailer's store. For example, if during a visit to the retailer's store the previous week, the customer rented movies from the video department, a record associated with the movie rental would be stored in the customer's user profile. Hence, while obtaining product information with the terminal 20, a survey question relating to the pleasantness of the customer's experience in the video department may be displayed on the marketing portion 36a of the display monitor 36. Moreover, the retailer may desire to solicit a response from the customer as to the possibility of adding additional services or departments to the retailer's operation. For example, if the retailer is considering adding a fresh seafood department, the retailer may direct a survey question to customers which currently buy frozen or pre-packaged seafood products on a regular basis. Moreover, survey questions of a general nature may also be displayed on the marketing portion 36a of the screen associated with the display monitor 36 during operation of the consumer interactive terminal 20. For example, the retailer may desire to solicit a response as to the general cleanliness of the store or friendliness of the employees. Such general questions are particularly useful in the case of a first time customer who does not yet have a user profile associated therewith. However, as described above, various criteria may be utilized by the retailer to determine which customized survey questions should be displayed on the marketing portion 36a of the display monitor 36 with the above-discussion being exemplary in nature. Once the electronic file associated with a customized retail survey has been retrieved from the survey database 54 by the central server 42, the routine 100 advances to an advertisement subroutine 154 (see FIG. 8).

Figure 8:
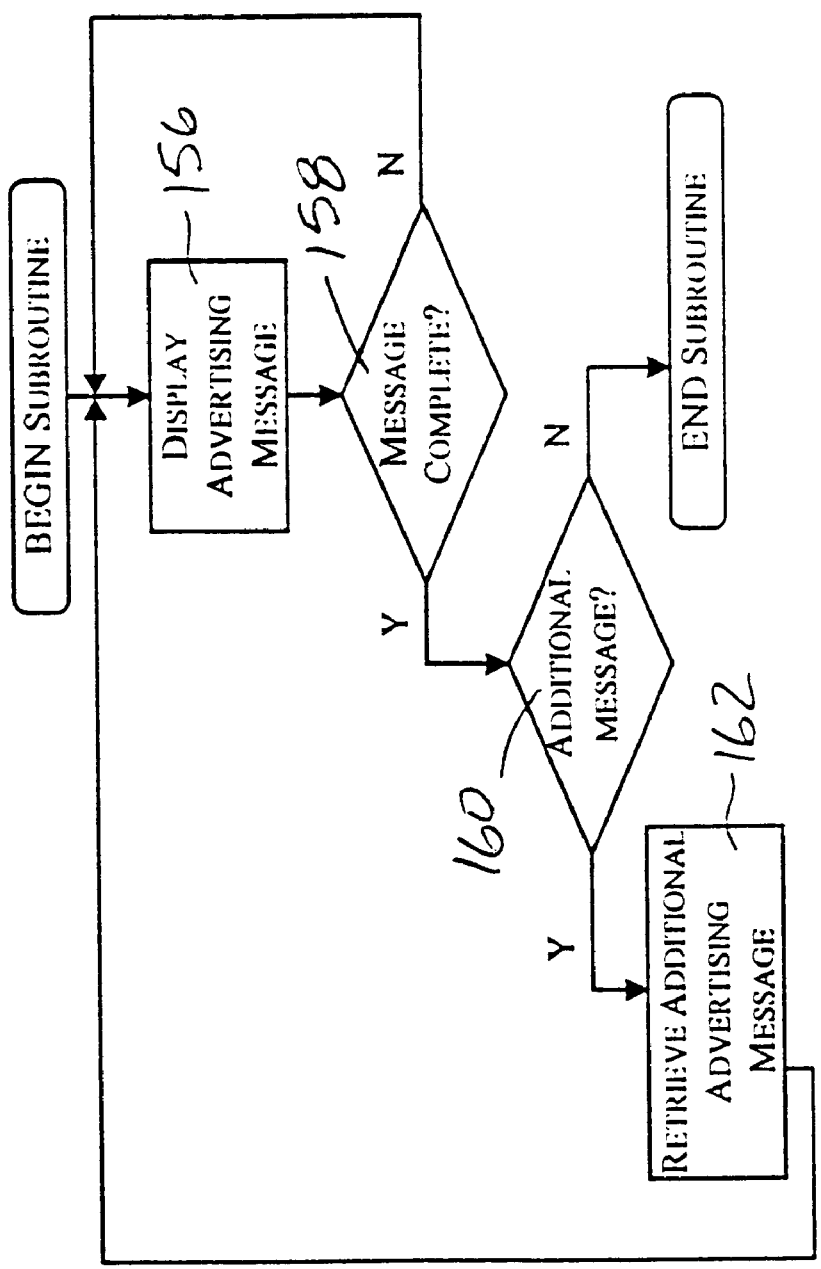
FIG. 8 is a flowchart which sets forth an information terminal advertisement subroutine of the general procedure of FIG. 5.

As shown in FIG. 8, the subroutine 154 begins with step 156 in which the customized advertising message is displayed on the marketing portion 36a of the display monitor 36. In particular, the central server 42 transmits or otherwise communicates the retrieved electronic file associated with the customized advertising message to the consumer interactive terminal 20 such that the video and/or audio advertising message associated with the retrieved file may be displayed on the marketing portion 36a of the display monitor 36. Moreover, if the customized advertising message includes information in the form of an incentive voucher, the central server 42 transmits or otherwise communicates the retrieved electronic file associated with the customized advertising message to the consumer interactive terminal 20 such that the incentive voucher associated with the retrieved file may be printed with a printer associated with the terminal 20. The subroutine 154 then advances to step 158.

In step 158, the central server 42 determines if playback of the advertising message is complete. In particular, the consumer interactive terminal 20 generates an output signal which is sent to the central server 42 when the entire customized advertising message has been displayed by the terminal 20. If the advertising message has be displayed completely by the consumer interactive terminal 20, the subroutine 154 advances to step 160. If playback the advertising message is not yet complete, the subroutine 154 loops back to step 156 to continue display of the advertising message.

In step 160, the central server 42 determines if an additional advertising message is to be displayed on the consumer interactive terminal 20. In particular, the retailer may configure the retail system 10 such that advertising messages are displayed during the entire time period in which the customer is operating the consumer interactive terminal 20, or alternatively, the retailer may elect to only display a predetermined number of messages during a given use of the terminal 20. Hence, in step 160, if an additional advertising message is to displayed on the consumer interactive terminal 20, the subroutine 154 advances to step 162. If no additional advertising messages are to be displayed on the consumer interactive terminal 20, the subroutine 154 then ends thereby advancing the routine 100 (see FIG. 5) to a survey subroutine 164.

In step 162, the central server 42 retrieves an electronic file associated with an additional customized advertising message. In particular, the central server 42 communicates with the mass storage device 46 in order to retrieve an additional customized advertising message from the promotion database 52 based on information included in the customer's user profile in the manner previously discussed in regard to step 112. The subroutine 154 then loops back to step 156 to display the additional advertising message in the manner previously discussed.

Figure 9:
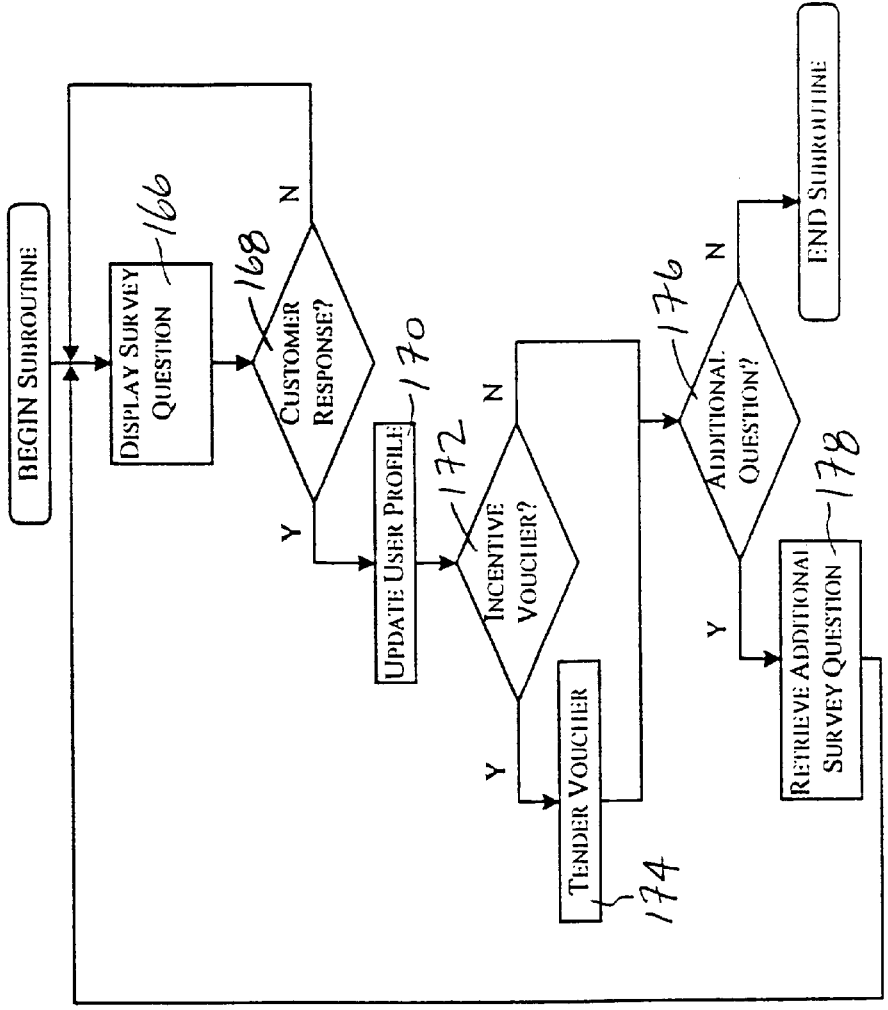
FIG. 9 is a flowchart which sets forth an information terminal survey subroutine of the general procedure of FIG. 5.

Returning now to step 160, if no additional advertising messages are to be displayed on the consumer interactive terminal 20, the subroutine 154 then ends thereby advancing the routine 100 (see FIG. 5) to a survey subroutine 164. As shown in FIG. 9, the subroutine 164 begins with step 166 in which the customized retail survey is displayed on the marketing portion 36a of the display monitor 36. In particular, the central server 42 transmits or otherwise communicates the retrieved electronic file associated with the customized retail survey to the consumer interactive terminal 20 such that the retail survey associated with the retrieved file may be displayed on the marketing portion 36a of the display monitor 36. It should be appreciated that the retail survey may be displayed in conjunction (i.e. concurrently) with an advertising message, or alternatively the retail survey may be cued by the processing unit associated with the consumer interactive terminal 20 for display upon completion of the advertising message. In particular, priority between displaying the advertising message or the retail survey may be established by the retailer to fit the particular needs of a given retail system 10. The subroutine 164 then advances to step 168.

In step 168, the central server 42 determines if the customer has entered a response to the displayed retail survey question. In particular, the processing unit associated with the consumer interactive terminal 20 generates an output signal which is sent to the central server 42 when the customer touches a particular area of the touch screen associated with the display monitor 36 or otherwise enters a response. If the customer enters a response to the displayed retail survey question, the subroutine 164 advances to step 170. If the customer has not yet entered a response to the displayed retail survey question, the subroutine 164 loops back to step 166 to continue displaying the retail survey question to the customer.

In step 170, the central server 42 updates the customer's user profile in the user profile database 50. In particular, the central server 42 communicates with the mass storage device 46 such that a record associated with the customer's response to the retail survey question is included in the customer's user profile for subsequent use by the retail system 10. It should also be appreciated that a separate database may also be updated to add the customer's response to the responses from other customers to the same survey question. The subroutine 164 then advances to step 172.

In step 172, the central server 42 determines if an incentive voucher is to be presented to the customer due to his or her response to the displayed survey question. In particular, as discussed above, an incentive voucher may be offered to the customer for answering the questions associated with the retail survey. For example, if the customer answers the questions associated with the particular type of beer he or she previously purchased, a coupon may be printed for a discount on a subsequent purchase of additional beer. It should be appreciated that the retailer may configure the retail system 10 so as to determine if or when an incentive voucher is to be offered to the customer. Hence, if the central server 42 determines that an incentive voucher is to be offered to the customer, the subroutine 164 advances to step 174. If the central server 42 determines that an incentive offer is not to be offered to the customer, the subroutine 164 advances to step 176.

In step 174, the consumer interactive terminal 20 tenders the incentive voucher to the customer. In particular, the incentive voucher may be printed with a printer associated with the terminal 20. Moreover, the amount of the incentive voucher may be electronically deducted from the total amount of the customer's items for purchase when the customer subsequently checks out his or her items for purchase thereby eliminating the need to print the incentive voucher. Once the incentive voucher has been tendered, the subroutine 164 advances to step 176.

In step 176, the central server 42 determines if an additional retail survey question is to be displayed on the consumer interactive terminal 20. In particular, as described above, the number of questions included in a given retail survey displayed on the marketing portion 36a of the screen associated with the display monitor 36 may be altered based on usage of the consumer interactive terminal 20. For example, during periods of relatively high usage of the consumer interactive terminal 20, the number of questions in a given retail survey may be reduced in order to enhance throughput through the terminal 20. However, during periods of relatively low usage of the consumer interactive terminal 20, the number of questions in a given retail survey may be increased in order to increase the number of responses received from a given customer. Moreover, the retailer may configure the retail system 10 such that questions associated with a retail survey are displayed during the entire time period in which the customer operates the consumer interactive terminal 20, or may elect to only display a predetermined number of questions during operation of the terminal 20. Hence, in step 176, if an additional retail survey question is to be displayed on the consumer interactive terminal 20, the subroutine 164 advances to step 178. If no additional retail survey questions are to be displayed on the consumer interactive terminal 20, the subroutine 164 then ends thereby advancing the routine 100 (see FIG. 5) to step 180.

In step 178, the central server 42 retrieves an electronic file associated with an additional customized retail survey question or questions. In particular, the central server 42 communicates with the mass storage device 46 in order to retrieve an additional customized retail survey question or questions from the survey database 54 based on information included in the customer's user profile in the manner previously discussed in regard to step 152. The subroutine 164 then loops back to step 166 to display the additional retail survey question in the manner previously discussed.

Returning now to discussion of the routine 100 (see FIG. 5), in step 180 the processing unit associated with the consumer interactive terminal 20 determines whether the customer has requested product information or the like from the terminal 20. In particular, the processing unit determines if the customer has touched a particular area of the touch screen associated with the display monitor 36 or otherwise entered a request for product information or the like. If the customer has requested product information or the like, the routine 100 advances to step 182. If the customer has not requested product information or the like, the routine 100 loops back to the advertisement subroutine 154 in order to continue display the advertising message and/or the retail survey. Hence, it should be appreciated that the advertising message and/or the retail survey is displayed on the marketing portion 32a of the screen associated with the display monitor 32 during the period of time in which the customer is operating the consumer interactive terminal 20 so as to obtain product information therewith.

In step 182, the processing unit associated with the terminal 20 causes the product information associated with the customer's request to be displayed on the display monitor 36. In particular, the processing unit communicates with the central server 42 to obtain product information (e.g. description and price) associated with the requested item from the master product database 48. Thereafter, the processing unit of the terminal 20 generates an output signal which causes the display monitor 36 to display the product information associated with the requested item. The routine 100 then advances to step 184.

In step 184, the central server 42 updates the customer's user profile in the user profile database 50. In particular, the central server 42 communicates with the mass storage device 46 such that a record associated with the customer's request is included in the customer's user profile for subsequent use by the retail system 10. For example, if the customer requests information about a particular type of bubble gum, a record associated with the customer's bubble gum request is stored in the customer's user profile. The routine 100 then advances to step 186.

In step 186, the processing unit associated with the consumer interactive terminal 20 monitors output from the display monitor 36 in order to determine whether there are more product information requests to be responded to. In particular, a message is displayed on the display monitor 36 instructing the customer to touch a particular touch screen area of the display monitor 36 when the customer has no further product information requests.

If a particular output is detected from the display monitor 36, the terminal 20 determines that the customer's operation of the consumer interactive terminal 20 is complete and the routine 100 then ends thereby placing the consumer interactive terminal 20 in an idle state until activation thereof by a subsequent customer. If a particular output is not detected from the display monitor 36, the terminal 20 determines that the customer has additional product information requests, and the routine 100 returns to subroutine 154 in order to continue displaying an advertising message and/or a retail survey during subsequent use of the consumer interactive terminal 20.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

For example, it should be appreciated that the retail terminals 12 may be actuated in a number of various manners in addition to use of the card readers (e.g. the card reader 38 of the consumer interactive terminal 20). For example, the customer may be issued a magnetic card that upon entry of the customer to within a predetermined area surrounding the retail terminal 12 causes the terminal 12 to be activated thereby causing the terminal 12 to retrieve the user profile associated with the approaching customer.

Moreover, it should be appreciated that the retailer may ascertain the effectiveness of the customized advertising messages and retail surveys by monitoring the user profile of a given customer. In particular, subsequent to displaying a customized advertising message via either displaying the message on the display monitor associated with the retail terminal 12 or printing an incentive voucher, the retailer may configure the retail system to monitor subsequent purchases by the customer to determine if the customer actually purchases the target item or redeems the incentive voucher.

Moreover, although the retail terminals 12 are herein described as being electronic terminals such as self-service checkout terminals, assisted checkout terminals, consumer interactive terminals, and kiosks, with use of such terminals having significant advantages in the present invention, other electronic terminals are also contemplated for use as the retail terminals 12 of the present invention. In particular, the retail terminals 12 may be any type of electronic device capable of two-way communications. For example, the retail terminals 12 of the present invention may include a hand held computer having a wireless modem associated therewith. One such hand held computer which is suitable for use, with slight modification thereof, is a Palm Pilot hand held computer which is commercially available from 3Com Incorporated of Santa Clara, Calif.

What is claimed is:

1. A method of advertising with a retail system having a display monitor associated therewith, comprising the steps of:
   operating a first terminal of said retail system in order to obtain product information associated with a first item without transacting a sale of said first item during said first terminal operating step;
   entering a record corresponding to said first item in a user profile in response to said first terminal operating step;
   operating a second terminal of said retail system so as to transact a sale of a second item; and
   displaying an advertising message on said display monitor during said second terminal operating step based on said record corresponding to said first item.

2. The method of claim 1, further comprising the step of:
   printing a coupon voucher based on said record corresponding to said first item which was entered in said user profile.

3. The method of claim 1, further comprising the steps of:
   printing a receipt in response to said user tendering payment for said second item; and
   printing a coupon voucher on a portion of said receipt based on said record corresponding to said first item which was entered in said user profile.

4. The method of claim 1, wherein:
   the first terminal includes a kiosk, and
   the second terminal includes a point-of-sale terminal.

5. The method of claim 1, wherein:
   the first terminal includes a consumer interactive terminal, and
   the second terminal includes a point-of-sale terminal.

6. The method of claim 1, wherein both the first terminal and the second terminal include a point-of-sale terminal.

7. The method of claim 6, wherein the point-of-sale terminal is a self-service checkout terminal.

8. The method of claim 6, wherein the point-of-sale terminal is an assisted checkout terminal.

9. A method of providing customer specific advertising with a retail system, comprising the steps of:

(a) operating a first terminal of said retail system in order to obtain product information associated with a first item without transacting a sale of said first item during said first terminal operating step;

(b) generating a record corresponding to said first item in response to said first terminal operating step;

(c) operating a second terminal of said retail system so as to transact a sale of a second item after step (a), said second terminal having a display monitor; and (d) displaying an advertising message on said display monitor during said second terminal operating step based on said record.

10. The method of claim 9, further comprising the step of:

printing a coupon voucher based on said record corresponding to said first item which was entered in said user profile.

11. The method of claim 9, further comprising the steps of:

printing a receipt in response to said user tendering payment for said second item; and printing a coupon voucher on a portion of said receipt based on said record.

12. The method of claim 1, wherein:

the first terminal includes a kiosk, and the second terminal includes a point-of-sale terminal.

13. The method of claim 9, wherein:

the first terminal includes a consumer interactive terminal, and the second terminal includes a point-of-sale terminal.

14. The method of claim 9, wherein both the first terminal and the second terminal include a point-of-sale terminal.

15. The method of claim 14, wherein the point-of-sale terminal is a self-service checkout terminal.

16. The method of claim 14, wherein the point-of-sale terminal is an assisted checkout terminal.

17. A method of providing customer specific advertising with a retail system, comprising the steps of:

generating a record corresponding to a first item in a user profile in response to a customer operating a first retail terminal so as to obtain product information associated with said first item without transacting a sale of said first item; and displaying an advertising message on a display monitor of a second terminal while said customer is operating said second terminal so as to transact a sale of a second item after said generating step, said advertising message being based on said record corresponding to said first item.

18. The method of claim 17, further comprising the step of:

printing a coupon voucher based on said record corresponding to said first item which was entered in said user profile.

19. The method of claim 17, further comprising the steps of:

printing a receipt in response to said user tendering payment for said second item; and printing a coupon voucher on a portion of said receipt based on said record corresponding to said first item which was entered in said user profile.

20. The method of claim 17, wherein:

the first terminal includes a kiosk, and the second terminal includes a point-of-sale terminal.

21. The method of claim 17, wherein:

the first terminal includes a consumer interactive terminal, and the second terminal includes a point-of-sale terminal.

22. The method of claim 17, wherein both the first terminal and the second terminal include a point-of-sale terminal.

23. The method of claim 22, wherein the point-of-sale terminal is a self-service checkout terminal.

24. The method of claim 22, wherein the point-of-sale terminal is an assisted checkout terminal.

* * * * *